Oct. 23, 1928.
C. COBB, JR
1,688,787
METHOD OF MAKING BRAKE SHOES
Original Filed May 18, 1926   5 Sheets-Sheet 4
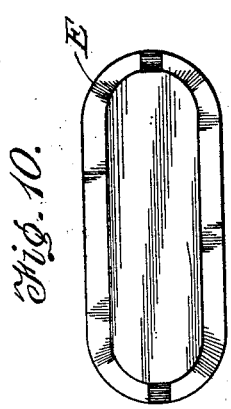
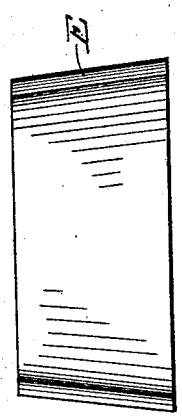
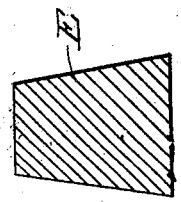
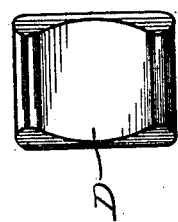
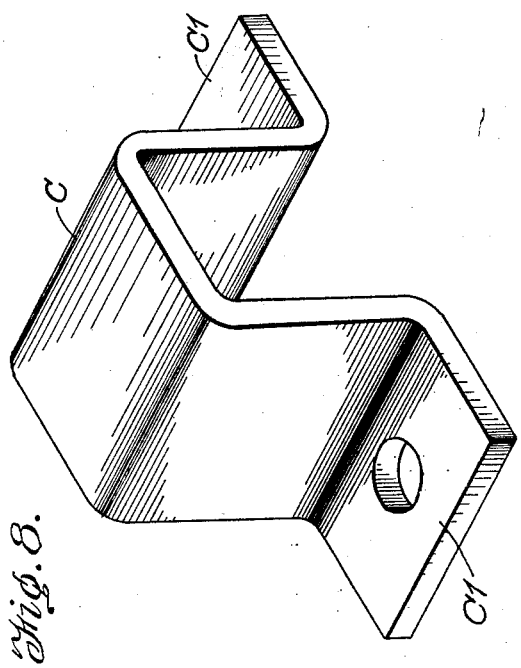
INVENTOR.
Charles Cobb Jr
BY Cyrus Kehr
ATTORNEY.

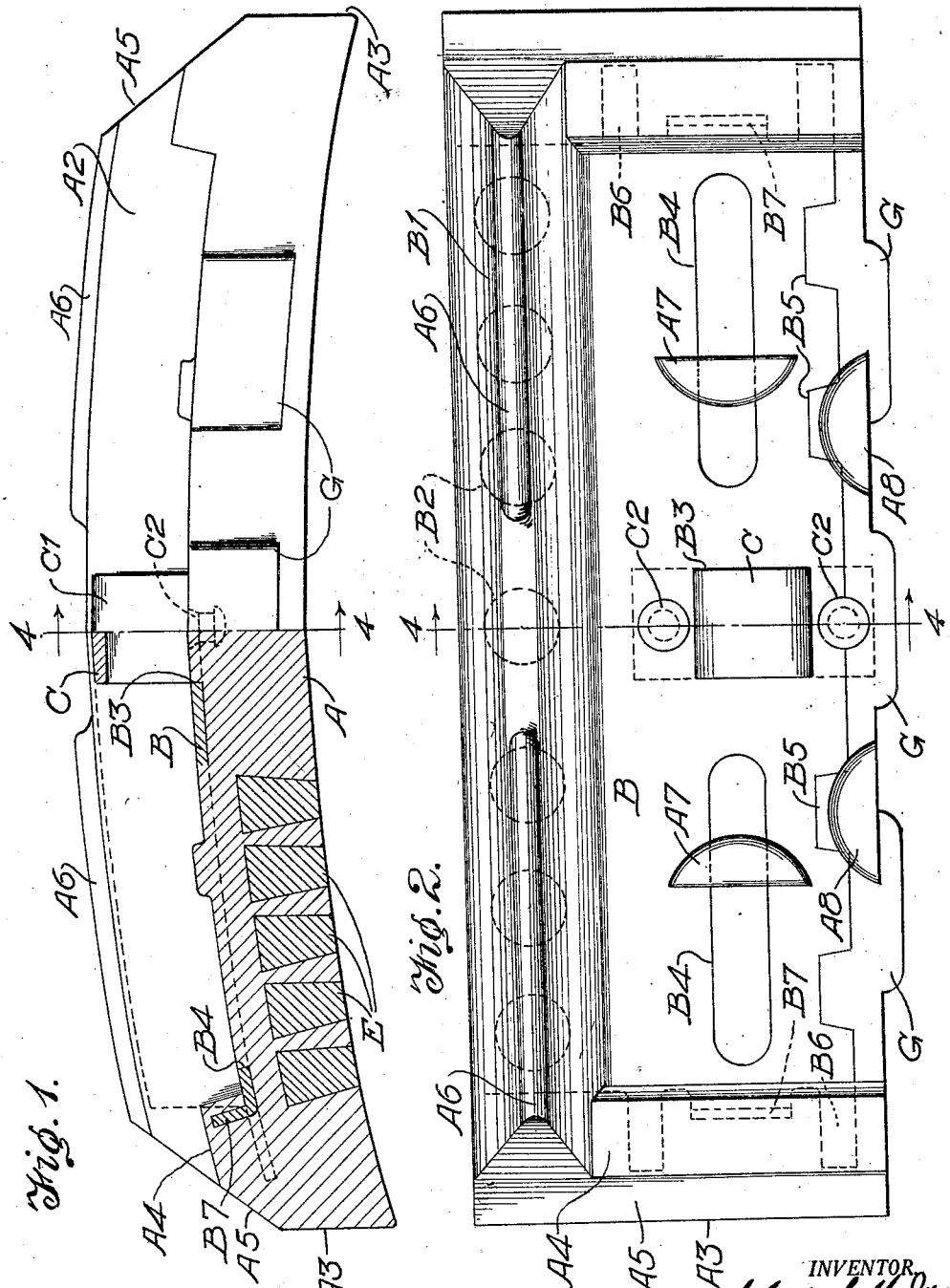

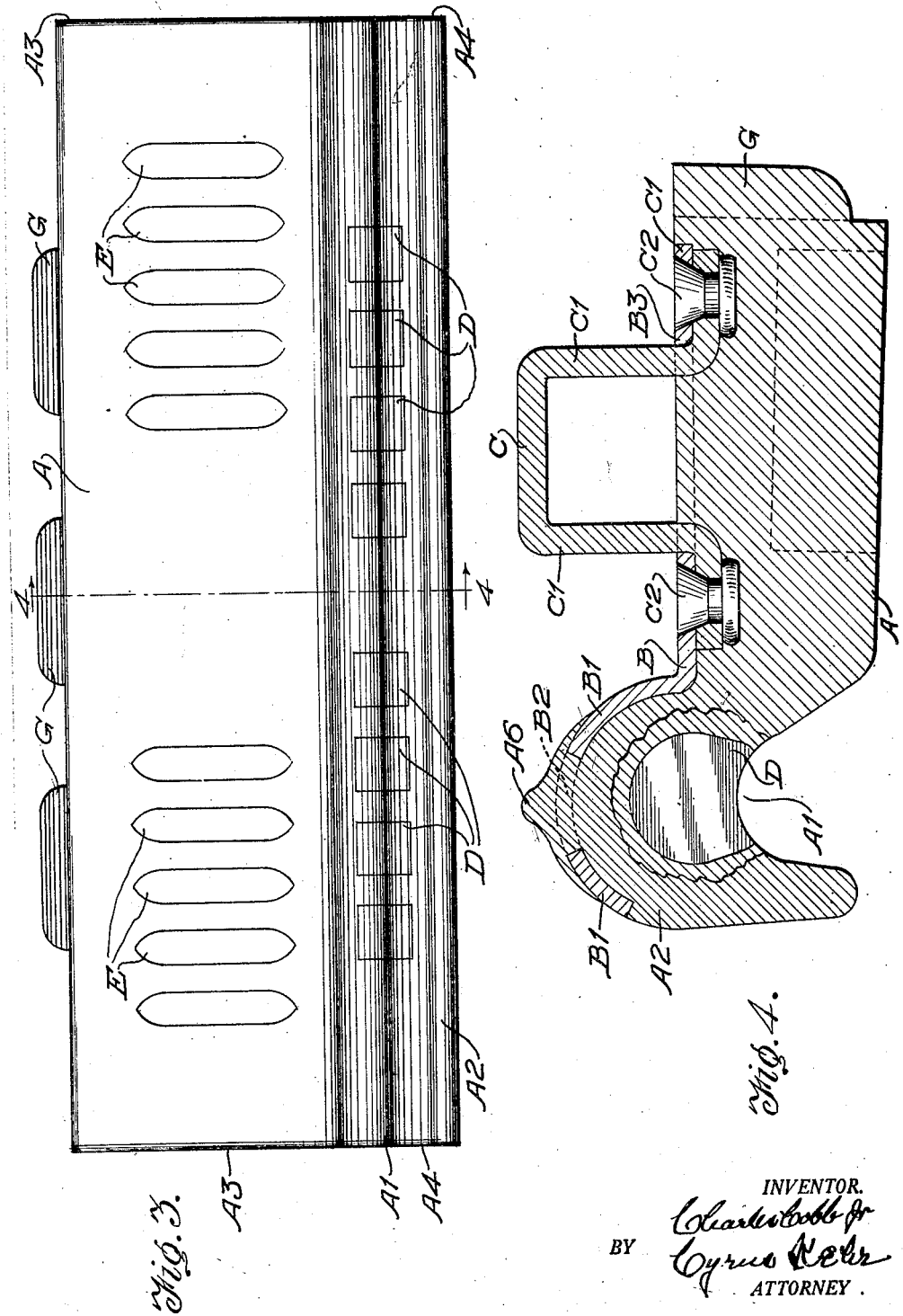

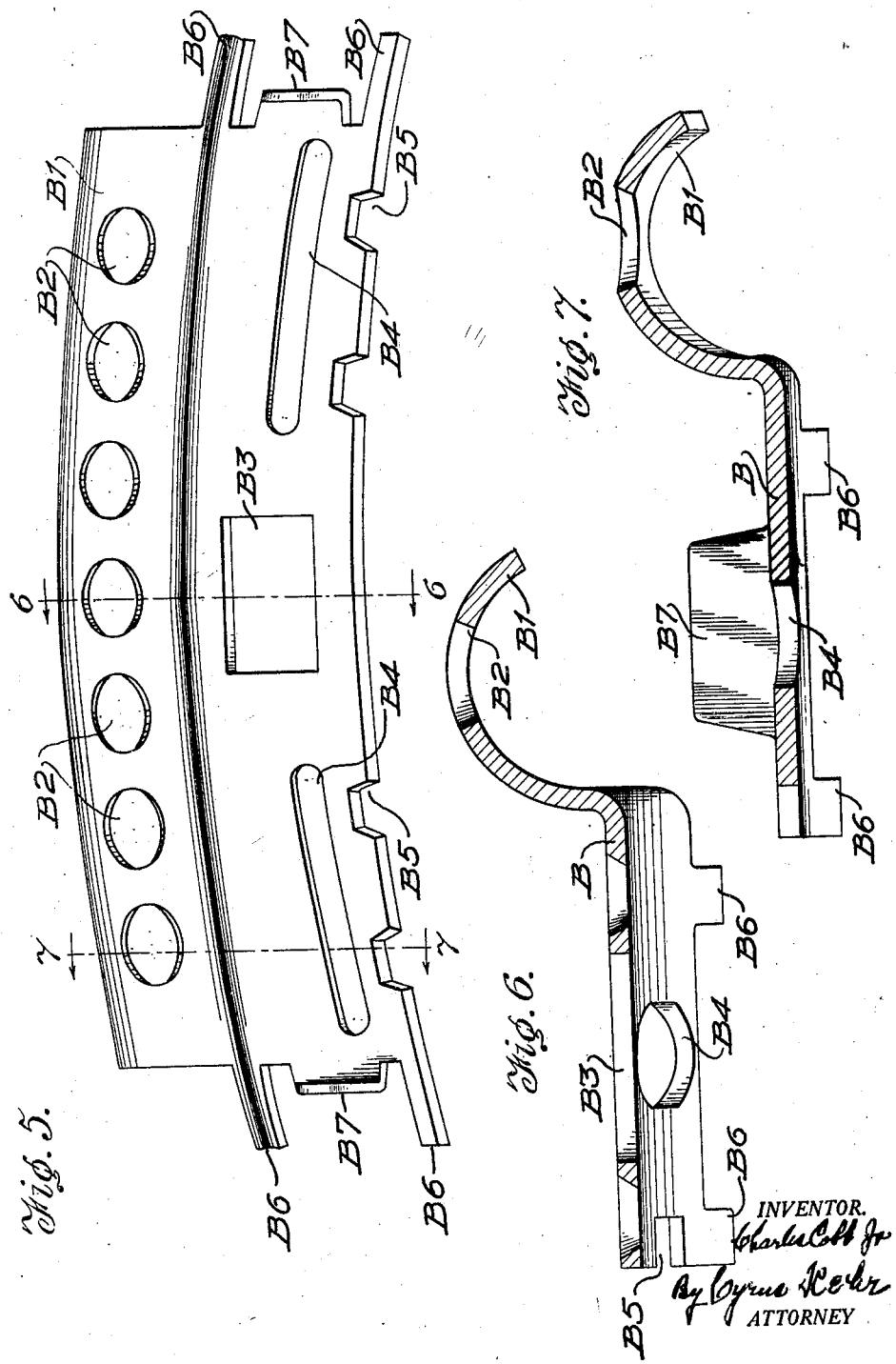

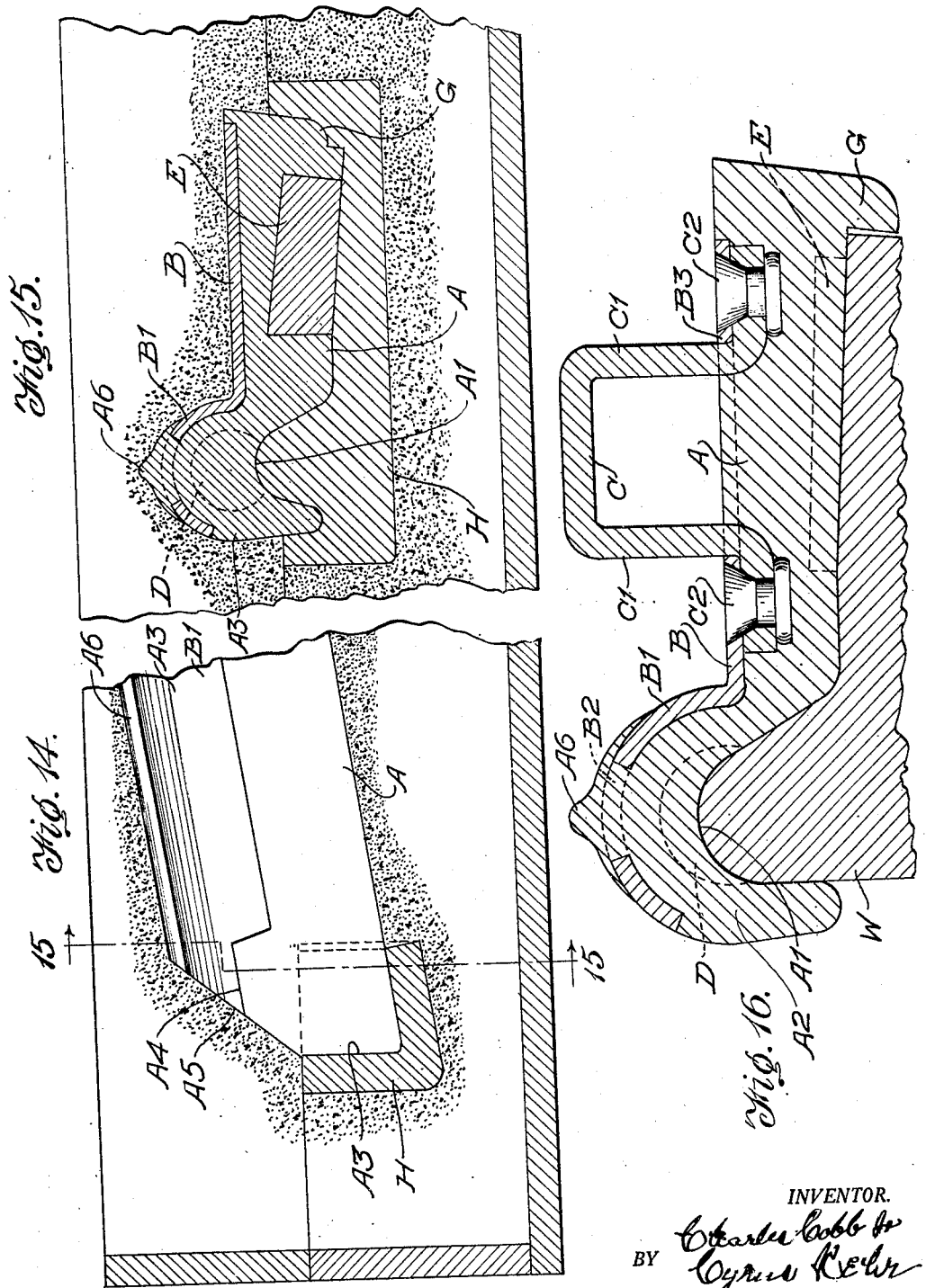

Patented Oct. 23, 1928.

1,688,787

UNITED STATES PATENT OFFICE.

CHARLES COBB, JR., OF MARSHALL, TEXAS.

METHOD OF MAKING BRAKE SHOES.

Original application filed May 18, 1926, Serial No. 109,900. Divided and this application filed March 4, 1927. Serial No. 172,772.

This invention relates to methods of making brake shoes to be applied to the brake equipment of railway cars.

The object of this invention is to provide a convenient and effective method for the production of such brake shoes.

This application is a division of my application, Serial Number 109,900, filed by me May 18, 1926, for an improvement in brake shoes, now Patent No. 1,638,759, dated August 9, 1927.

In the accompanying drawings,

Fig. 1 is a sectional edge elevation of a brake shoe constructed according to my in15 vention;

Fig. 2 is an elevation showing the back of the same shoe—as viewed looking toward the right as shown in Fig. 1;

Fig. 3 is an elevation of the inner or con20 cave face of the shoe;

Fig. 4 is a transverse horizontal section on the line, 4—4, of Figs. 1, 2 and 3;

Fig. 5 is a perspective of a back plate forming a part of the shoe;

Fig. 6 is a transverse section on the line, 6—6, of Fig. 5, looking in the direction of the arrow;

Fig. 7 is a transverse section on the line, 7—7, of Fig. 5, looking in the direction of the arrow;

Fig. 8 is a perspective of a loop fixed rigidly on the back of the shoe;

Figs. 9, 10 and 11, are respectively, an elevation, a plan, and a transverse section of one of the chilling blocks put into the flat inner face of the shoe;

Figs. 12 and 13 are, respectively, a plan and an elevation of one of the chilling blocks embedded in the channel of the inner face of the shoe;

Fig. 14 is an upright section of one half of a mold in which one of these shoes is to be cast;

Fig. 15 is a transverse section on the line, 15—15, of Fig. 14, the chilling blocks and the back plate being in position and the molten metal having been poured;

Fig. 16 is a view like Fig. 4, the metal on the inner face of the shoe having been worn away and a cross-section of a part of the driver having been added.

Referring to the drawings, the structure of the finished shoe will first be described. Thereafter the manner of forming the mold and the pouring of the molten metal will be described.

The main parts of this shoe are the cast body, A, and the plate steel or wrought iron back, B. The concave inner face of the body, A, is curved to conform to the exterior of the locomotive drive wheels to which the shoe is to be applied. This shaping includes the groove or channel, $A^1$, which is to receive the flange of the driver or wheel, W. (Fig. 16). To provide sufficient metal back of the groove or channel, $A^1$, the cast body has an outward extension, $A^2$, reaching from end to end of the shoe. Each end of the shoe has a transverse face, $A^3$, in front of which is a transverse extension, $A^4$, which has a slanting face, $A^5$.

The back, B, is partially embedded in the cast body, A. The main part of said back is flat. An auxiliary part, $B^1$, is curved to conform to the back face of the extension, $A^2$, of the cast body, A. Along the part, $B^1$, the back has apertures, $B^2$, through which the cast metal of the body, A, reaches to engage and hold the back. Figs. 1, 2, 4, 15 and 16 show the cast metal extended above the apertures, $B^2$, and spread on the outer face of the plate, B, and Figs. 1 and 2 show this cast metal on the back in the form of a continuous rib, $A^6$, extending over all excepting the middle aperture. These apertures, $B^2$, are shown circular; but they may be of any desired form.

On the flat part of the back, midway between its ends, there is a rectangular opening, $B^3$, which receives the loop, C. The loop has feet, $C^1$, which overlap the inner face of the plate, B. Rivets, $C^2$, extend through each foot and the adjacent part of the back, B, to secure the loop to the back. The heads of the rivets are embedded in the cast body, A. This loop is used for making engagement between the brake shoe and the brake beam in the usual manner.

Between each end of the plate, B, and the loop, the plate has a longitudinal slot, $B^4$, through which the cast metal of the body, A, extends and partially covers the plate adjacent the slot. The drawings show, for this purpose, a lug, $A^7$, of the cast metal formed to extend across the slot, $B^4$, and the adjacent outer face of the plate, B. At its edge which is adjacent the loop, C, the plate, B, has notches, B⁵, into which the cast metal extends for the purpose of making stronger engagement between the plate and the cast metal. To increase this engagement, lugs, A⁸, are formed on the body, A, at two of these notches to extend over adjacent parts of the back.

At each end corner of the flat part of the plate, B, there is a tongue, B⁶, parallel to the length of the plate and embedded in the back extension, A⁴, extending transversely across the body, A, as above stated. At each end of the plate, B, and between the tongues, B⁶, there is a tongue, B⁷, turned outward to stand perpendicular to the adjacent part of the plate. This tongue, B⁷, is also embedded in the extension A⁴, of the body, A.

In the groove or channel, A¹, are metal blocks or inserts, D, of approximately three quarter moon shape. One of these inserts is shown separately by Figs. 12 and 13. The concave face of each insert is flush with the adjacent face of the channel, A¹. The drawings show eight of these inserts arranged in groups of four at opposite sides of the middle transverse plane of the shoe. The function of these inserts will be explained further on.

In the flat face of the cast body, A, elongated inserts, E, are placed in planes transverse to the length of the shoe. These inserts are shown tapering or wedge-form in cross-section, and the narrow face of each insert is flush with the adjacent inner face of the body, A. But space is preferably left between the ends of the inserts, E, and the part of the mold which is to form the adjacent side edge of the body, A, as shown by the drawings. One of these inserts is illustrated by Figs. 9, 10 and 11.

On the edge of the cast body, A, which is adjacent the loop, C, are three lugs, G, which extend from the back of the body, A, nearly to the inner face of the body. The function of these lugs will be explained further on.

Each end of the body, A, is "chilled" in the mold, as will be described further on.

The manner of casting will now be described.

The lower mold section is formed with sand facing adapted to form the bottom and side faces of the body casting, the angle plates, H, being placed at the ends of said mold section to form and chill the ends of the body, A, as above described. The inserts, D and E, are placed on the bottom of this mold section in positions as already described. One side face of this mold section is recessed to form the three side lugs, G. The back, B, having the loop, C, attached as above described, is placed into the upper mold section, sand facing being provided for the parts of the shoe which are not to be covered by the back, B. Sand is also placed against the outer face of the back, excepting above and adjacent the apertures, B² and B⁴, and the notches, B⁵, through which the molten metal is to rise, as above described. At those places, the mold is to be recessed above the back to conform to the shape which is to be given to the molten metal above the back. At each end the upper mold section is recessed for forming the transverse extension, A⁴, of the body, A. Then the molten metal is poured into the mold and allowed to cool, the cooling being slow along the sand faces of the mold and being faster where the molten metal makes contact with the inserts, D and E, and the end plates, H, and with the back, B.

The inserts, D and E, serve to "chill" the adjacent cast metal. They are placed near enough to each other to allow this chilling to include all the cast metal in the spaces between the inserts. A space of one-half an inch has been found satisfactory. In this manner extended chilled areas are provided on the concave or inner face of the shoe.

The inserts, D and E, are omitted at the middle of the shoe, because the chilling which would be produced by the presence of the inserts in that part of the shoe would tend to weaken the shoe. Omitting this chilling makes the metal in the inner part of the cross-section in that part of the body, A, softer and tougher and stronger. Furthermore, while this part of the shoe is thus made stronger, the softness has advantage because it allows more rapid wearing away than in other parts of the face of the shoe. That is desirable, because it permits stronger engagement of the other parts of the face of the shoe with the driver.

One of the purposes of the lugs, G, on the body, A, is to increase the cross-section of the shoe where the lugs are applied and thereby make those parts of the body stronger.

These lugs are located at the points where the shoe usually tends to crack and break in service, particularly after considerable wear. The middle lug is at a point of pressure, and there the body of the shoe is weakened by the insertion of the loop, C. The other lugs are between points of pressure or at points of great strain. The lugs placed at those points give increased cross-section to the body, A, at those points. It is also to be noted that, when the molten metal is poured into the mold, the part of said metal which comes into contact with the metal back, B, becomes chilled; but the lugs, G, are outside of the area of chilling action exerted by the back, B. Hence the metal in the lugs is softer and tougher and stronger than is the part of the metal which is chilled by the back. As above stated, the inserts, E, do not extend to the adjacent upright edge of the body, A. It is intended that the metal intermediate the lugs and the inserts shall be sufficiently thick to limit the chilling action of the inserts, E, to such intermediate metal, whereby the lugs are left soft and tough.

A further purpose is to use these lugs as a means to aiding retaining the shoe on the rim of the drive wheel, W, when a considerable part of the shoe has been worn away so that the shoe takes the form illustrated by Fig. 16, wherein the shoe has been worn away to such extent as to leave only parts of the inserts and to leave the inner ends of the lugs, G, projecting inward beyond the inner or working face of the shoe. These projecting parts of the lugs, G, will extend over the edge of the drive wheel and supplement the action of the extension, A², as means to limit sidewise movement of the shoe on the drive wheel. This additional means for retaining the shoe in position is desirable after such reduction of the shoe, because the wearing away of the metal in the channel, A¹, may be so uneven or inaccurate as to cause such defective fit on the driver flange as to create danger of failure to hold the shoe against sidewise movement. It is to be noted that the lugs, G, might be extended to and even farther than the inner face of the shoe; but their assistance in holding the shoe on the wheel is not needed until a considerable part of the shoe has been worn away. If the lugs were so extended, they would, after a part of the shoe has been worn away, project so far or be so long as to make them likely to break. Such breaking would probably be at the base of the projecting part of the lugs. Then the lugs could not function as means for holding the shoe in position. Further, if at the time of casting, these lugs were formed as far as the inner face of the shoe, the adjacent part of the inner face of the shoe would, on account of the large area of molten metal be soft, while hardness in the inner face of the shoe is desired. But when the shoe has been worn so as to leave these lugs project, it is especially desirable that the lugs be tough and strong. To produce that condition, chilling of the lugs is avoided as above described.

By placing a plurality of these lugs on the body, A, the lugs serve to keep the shoe parallel to the plane of the driver.

It is desirable to provide strength and maximum contact and longest wear with a minimum of metal. For that reason the individual lugs are used in lieu of a continuous addition of metal along the edge of the body, A. Such a continuous addition would add to the cross-section of the shoe and would lead to the forming of a continuous flange to assist in holding the shoe on the wheel; but that would add unnecessary metal and weight to the shoe.

I claim as my invention,

1. The herein described method of forming a brake shoe, which method consists in forming a lower mold section having bottom, side and end faces conforming to the cast body of the shoe, and forming an upper mold section in which is a plate metal back having a group of apertures in a line parallel to the length of the shoe and said mold section being formed with a space above and along and adjacent said group of apertures, and then pouring molten metal into said mold, the metal filling the space in the mold below said back and rising through said apertures and into the space above and adjacent said apertures whereby a metal body is formed above said group to connect the metal extending through the apertures of said group.

2. The herein described method of forming a brake shoe, which method consists in placing into the mold at opposite sides of the middle transverse plane of the shoe metal inserts in position to form parts of the inner face of the shoe, said inserts being placed near enough to each other to extend chilling effect on the cast metal from one insert to the other, and then pouring molten metal into the mold.

3. The herein described method of forming a brake shoe, which method consists in placing a chilling plate into each end of the mold and placing into the mold metal inserts in position to form parts of the inner face of the shoe, said inserts being placed near enough to each other to extend chilling effect on the cast metal from one insert to the other, and then pouring molten metal into the mold.

4. The herein described method of forming a brake shoe, which method consists in placing a chilling plate into each end of the mold and placing into the mold metal inserts in position to form parts of the inner face of the shoe, said inserts being placed near enough to each other and near enough said chilling plates to extend chilling effect on the cast metal from each chilling plate to the adjacent insert and from one insert to the other, and then pouring molten metal into the mold.

5. The herein described method of forming a brake shoe, which method consists in forming a lower mold section having bottom, side and end faces conforming to the cast body of the shoe, one of the side faces having lateral extensions to form lugs, and forming an upper mold section in which is a plate metal back not reaching over said lateral extensions, and then pouring molten metal into said mold, whereby the metal under said plate metal back is chilled and the metal in said lugs is not chilled and is made tough.

In testimony whereof I have signed my name, this 17th day of February, in the year one thousand nine hundred and twenty-seven.

CHARLES COBB, Jr.